United States Patent [19]
Liu

[11] Patent Number: 6,010,145
[45] Date of Patent: Jan. 4, 2000

[54] COLLAPSIBLE TRAILER

[76] Inventor: Ching Rong Liu, No. 10, Sung-Chiang N. Rd., Chung-Li City, Taiwan

[21] Appl. No.: 09/066,553

[22] Filed: Apr. 28, 1998

[51] Int. Cl.$^7$ ........................................................ B62B 3/00
[52] U.S. Cl. .................. 280/655.1; 280/656; 280/47.34; 220/6
[58] Field of Search ........................... 280/87.01, 87.021, 280/655.1, 656, 47.34; 301/111; 24/324, 17 B, 30.5 P; 220/6; 16/405, 114.1

[56] References Cited

U.S. PATENT DOCUMENTS

| | | | |
|---|---|---|---|
| 3,147,523 | 9/1964 | Logan . | |
| 3,161,929 | 12/1964 | Swett . | |
| 3,236,539 | 2/1966 | Ketterer | 280/87.01 |
| 4,175,768 | 11/1979 | Thackray | 280/656 X |
| 4,240,555 | 12/1980 | Jurasek | 220/6 X |
| 4,577,772 | 3/1986 | Bigliardi | 220/6 X |
| 5,249,823 | 10/1993 | McCoy | 280/656 |
| 5,415,311 | 5/1995 | Coogan | 220/6 |
| 5,449,224 | 9/1995 | Johnson | 280/47.34 X |
| 5,465,996 | 11/1995 | Wisz | 280/47.34 X |
| 5,653,458 | 8/1997 | Chaparian | 280/87.021 X |
| 5,664,799 | 9/1997 | Cavanaugh | 280/656 |
| 5,749,589 | 5/1998 | Hopkins | 280/47.34 |

FOREIGN PATENT DOCUMENTS

| | | | |
|---|---|---|---|
| 01188037 | 10/1985 | U.S.S.R. | 280/47.34 |
| 8700133 | 1/1987 | WIPO | 280/656 |

*Primary Examiner*—Lanna Mai
*Attorney, Agent, or Firm*—Bacon & Thomas, PLLC

[57] ABSTRACT

The present utility relates a collapsible trailer which can be collapsed to a plane-shape when unused, and can be expanded to a basket-shape trailer with wheels and stick for conveying objects. The collapsible trailer comprises a bottom board, a primary wheel set on back side of the bottom board, a stick pivotally arranged on the trailer, a frame having two foldable boards pivoted on the bottom board and two lateral boards pivoted thereupon. The height of the lateral equals that of foldable boards in expanding state. When collapsing the trailer, the lateral boards are folded inward, and the foldable boards are folded such that the frame lies against the bottom board. The resulting configuration is fixed by a tenon provided on the trailer. Moreover, the stick is inverted to attach on the bottom board. Therefore, the trailer can be collapsed to a plane-shape. When the trail is to be used, the stick is drawn out and the tenon is unlocked. The frame is lifted from the bottom board and forms a basket shape with the lateral boards, thus achieving a workable state.

3 Claims, 7 Drawing Sheets

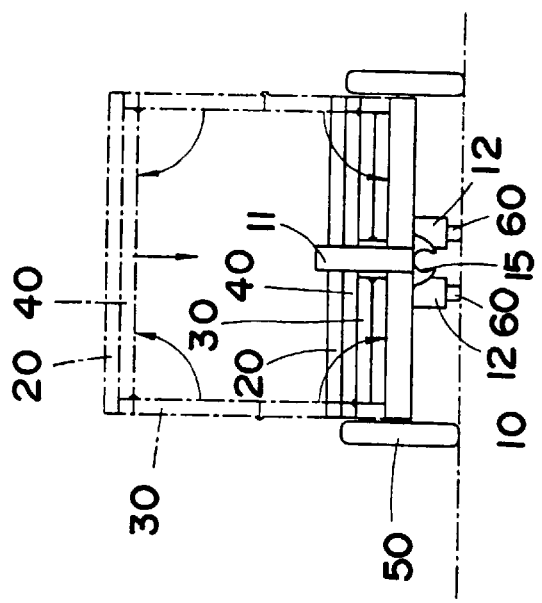
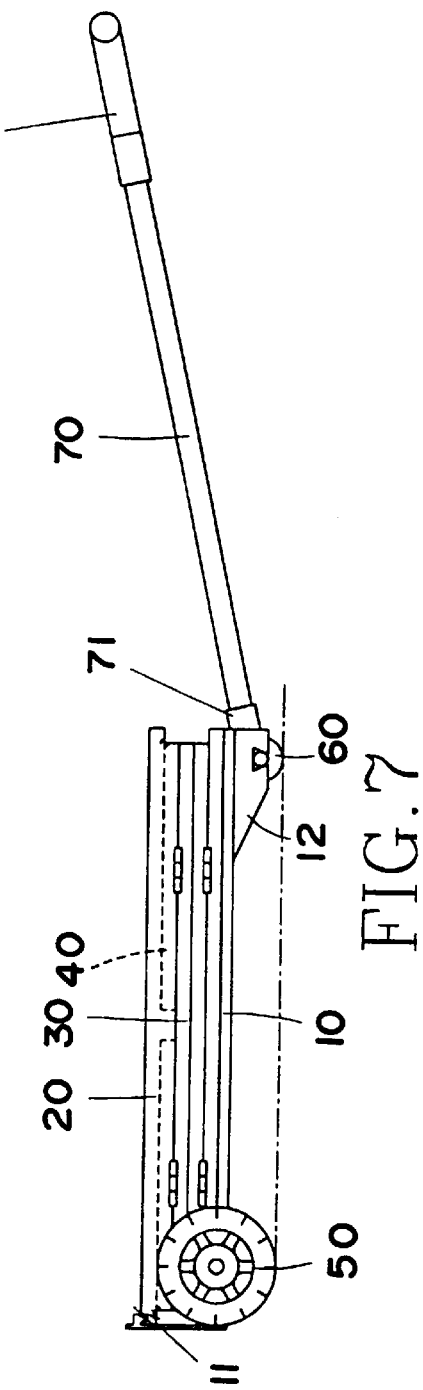
FIG. 6
FIG. 7

COLLAPSIBLE TRAILER

FIELD OF THE UTILITY

The present utility relates to a trailer, more particularly, to a collapsible trailer which can be collapsed to a plane-shape when unused, and can be expanded to a basket-shape trailer with wheel and stick for conveying objects.

BACKGROUND OF THE UTILITY

The conventional trailer is used for conveying objects, and comprises a basket for loading articles to be transferred, wheels arranged on bottom side of the basket, and a stick for grip of user.

However, the conventional trailer has following disadvantages:
1. The basket, wheel, and stick are arranged in a rigid manner, this make the trailer occupy a large space when unused.
2. The trailer is supported by the wheel, and the stick should be lifted when user want the trailer to move forward or backward. Therefore, the wheel is liable to be broken out when conveying a heavy load.

The present utility is intended to solve above problems by providing a collapsible trailer, which can save space when unused. Moreover, the collapsible trailer is provided with an auxiliary wheel on front side of the basket to provide firmer supporting force.

SUMMARY OF THE UTILITY

The object of the present utility is to provide a collapsible trailer which can be collapsed when unused, and is equipped with wheel and handing stick for sake of easy operation. The collapsible trailer according to the present utility comprises a bottom board, a primary wheel set on back side of the bottom board, a stick pivotally arranged on the trailer, a frame having two foldable boards pivoted on the bottom board and two lateral boards pivoted thereupon. The height of the lateral equals that of foldable boards in expanding state. When collapsing the trailer, the lateral boards are folded inward, and the foldable boards are folded such that the frame lies against the bottom board. The resulting configuration is fixed by a tenon provided on the trailer. Moreover, the stick is inverted to attach on the bottom board. Therefore, the trailer can be collapsed to a plane-shape. When the trail is to be used, the stick is drawn out and the tenon is unlocked. The frame is lifted from the bottom board and forms a basket shape with the lateral boards, thus achieving a workable state.

To enable better understanding of the objectives, configuration, structure or device characteristics and functions of the subject utility, please refer to the following detailed description with drawings;

BRIEF DESCRIPTION OF DRAWINGS

FIGS. 5, 6, and 7 show the operations for collapsing the collapsible trailer according to the present utility.

Figure 1:
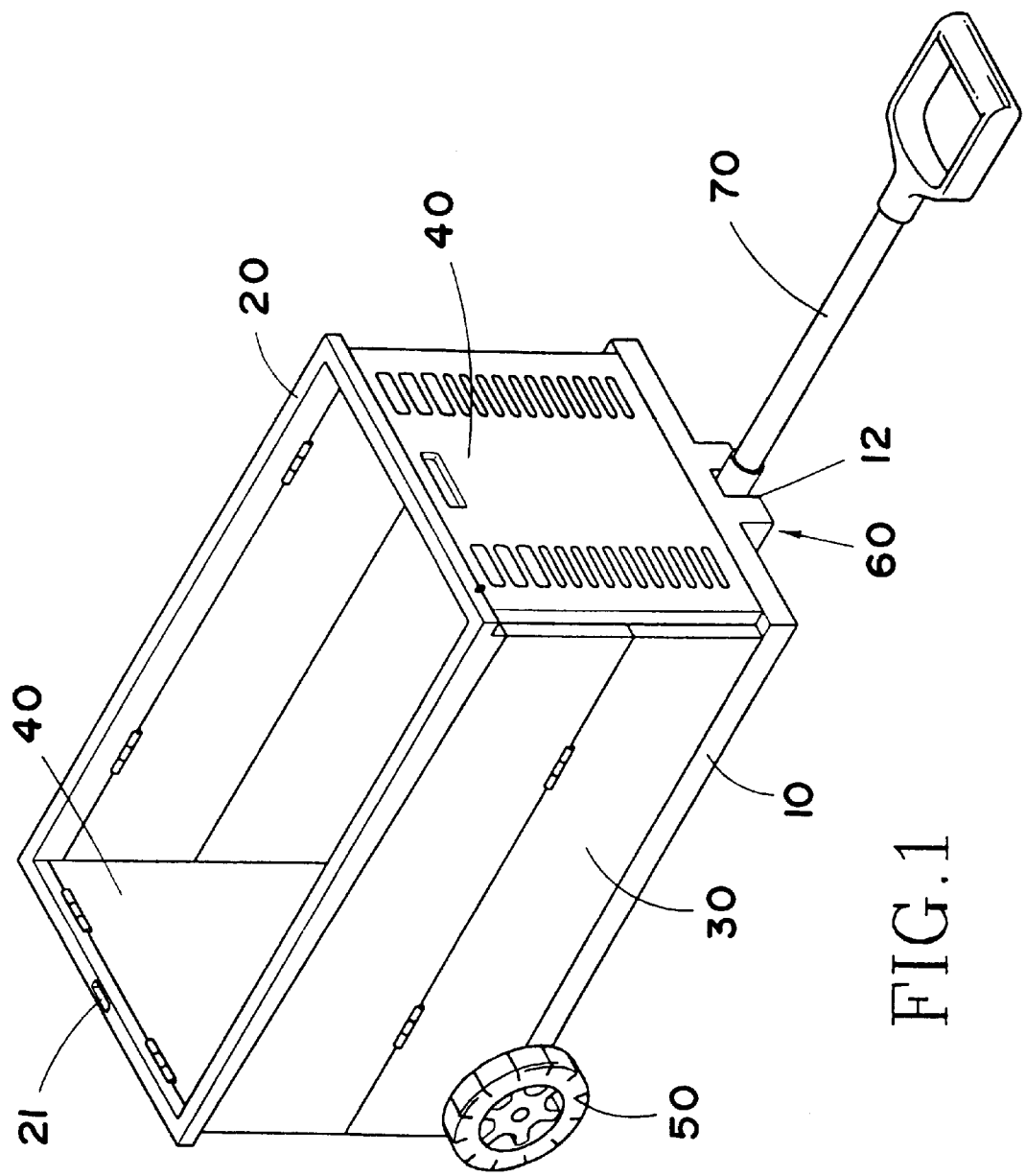
FIG. 1 is a perspective view showing the expanding state of the collapsible trailer according to the present utility.

BRIEF DESCRIPTION OF NUMERALS 10 bottom board
11 snapping tenon
12 pivoting stage
13 placing groove
14 coupling groove
15 fixing stage
16 clamping tenon
20 frame
21 snapping groove
30 foldable board
40 lateral board
50 primary wheel
60 auxiliary wheel
70 stick
71 envelope
72 grip
73 clamping groove

DETAILED DESCRIPTION OF PREFERRED EMBODIMENT

Figure 2:
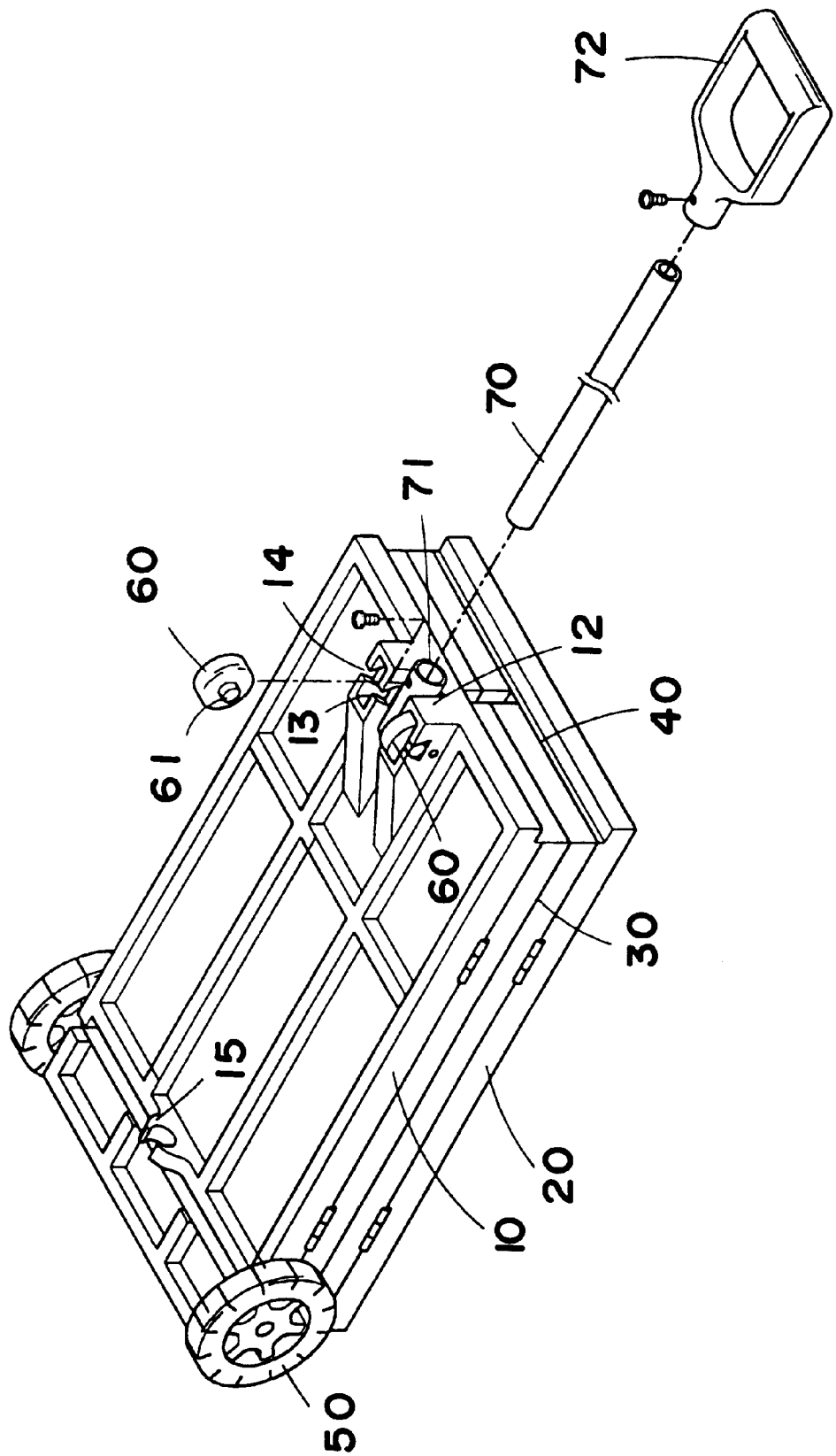
FIG. 2 is a perspective view showing the half-expanding state of the collapsible trailer according to the present utility.

As shown in FIGS. 1 and 2, the collapsible trailer according to the present utility comprises a bottom board 10, a frame 20, foldable boards 30, lateral boards 40, primary wheels 50, auxiliary wheels 60, and a stick 70.

Figure 8:
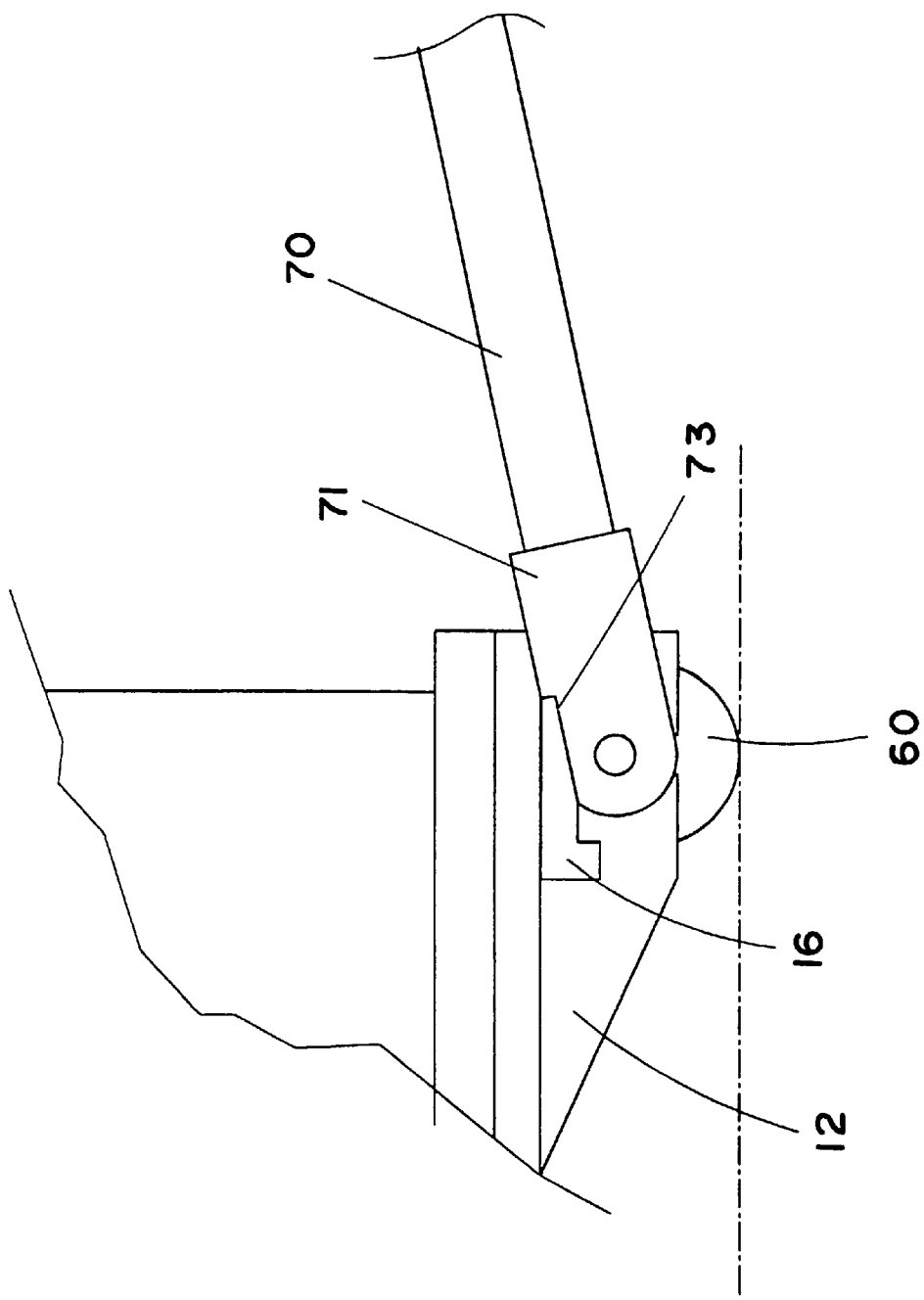
FIG. 8 shows the structure for fixing the stick.

The bottom board 10 is provided with a snapping tenon on one side, a pivoting stage 12 on front side thereof. The pivoting stage 12 is provided with a placing groove 13, which has a penetrating coupling-groove of dovetail shape on both sides. A fixing stage 15 is provided on the bottom side of the bottom board 10 and faces the pivoting stage 12. As shown in FIG. 8, a detachable clamping-tenon 16 is arranged on the bottom side of the pivoting stage 12.

The frame 20 is provided, on both side, with a set of foldable board 30 pivoted on the bottom board 10. The frame 20 can be, relative to the bottom board 10, moved upward and downward through the help of foldable board 30. The frame 20 is provided with snapping groove 21, which is corresponding to the snapping tenon 11.

The frame 20 is provided, on front and back side, with a set of lateral boards 40. The height of the lateral boards 40 equal that of the foldable board 30 in an expanding state. The frame 20 is lifted from the bottom board 10 and forms a basket shape with the lateral boards 40, thus achieving a workable state.

The bottom board 10 is provided with a primary wheel 50 on backside thereof.

The axis 61 of the auxiliary wheel 60 is embedded into the coupling groove 14, therefore the auxiliary wheel 60 can be placed within the placing groove 13.

The head portion of the stick 70 is pivoted on pivoting stage 12 through a sleeve 71. The end portion of the stick 70 is provided with a grip for sake of holding. The stick 70 can be inverted around the pivoting stage 12 and then fixed on the fixing stage. As shown in FIG. 8, the sleeve 71 is provided with a clamping groove 73 corresponding to the clamping tenon 16. The angle of the stick 70 can be fixed when the clamping tenon 16 is inserted into the clamping groove 73.

FIGS. 1 to 4 show the expanding state of the collapsible trailer according to the present utility. The frame 20 is lifted until the foldable boards 30 are fully expanded. The lateral boards 40 are drawn out to prop the bottom board 10. Therefore, the bottom board 10, the frame 20, the foldable boards 30, and the lateral boards 40 can form a basket shape. Finally, the stick 70 is drawn out to achieve a workable state.

Figure 5:
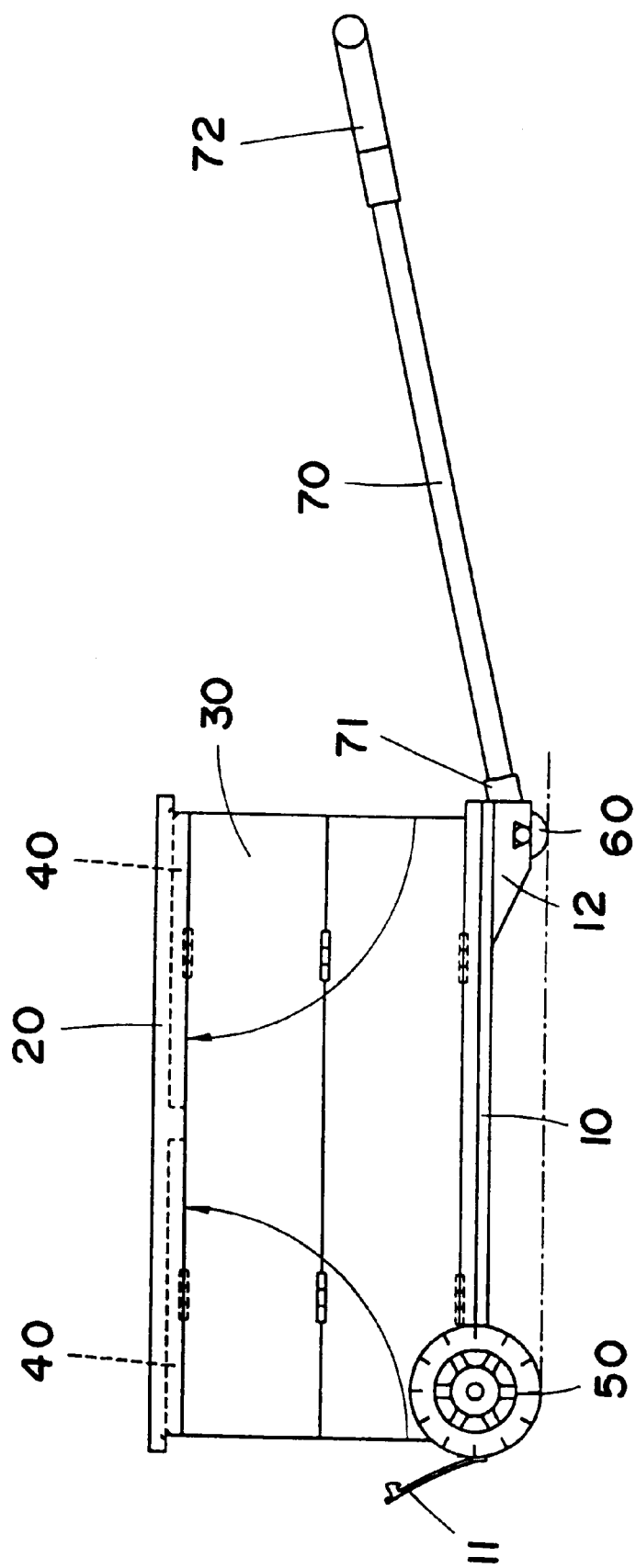

FIG. 5 shows the operations for collapsing the collapsible trailer according to the present utility. The lateral boards 40 are folded inward first. Then the foldable boards 30 are folded such that the frame 20 lies against the bottom board 10, as shown in FIGS. 6 and 7. The collapsed trailer is fixed by the snapping tenon 11 arranged on the bottom board 10. Finally, the stick 70 is inverted and attach to the bottom of the bottom board 10, thus collapsing the trailer to a plane-shape, as shown in FIG. 3.

Figure 3:
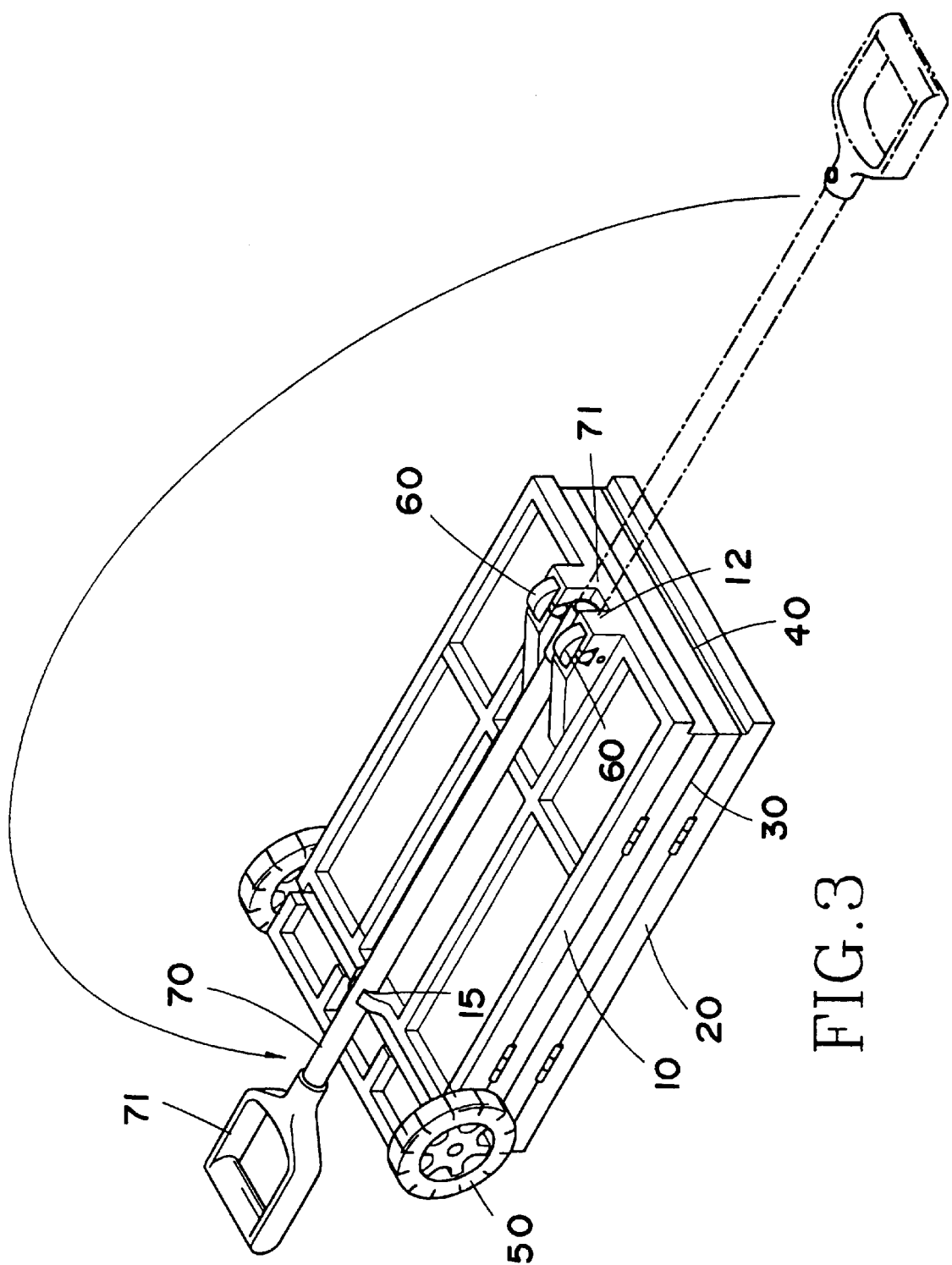
FIG. 3 is a perspective view showing the collapsed state of the collapsible trailer according to the present utility.
Figure 4:
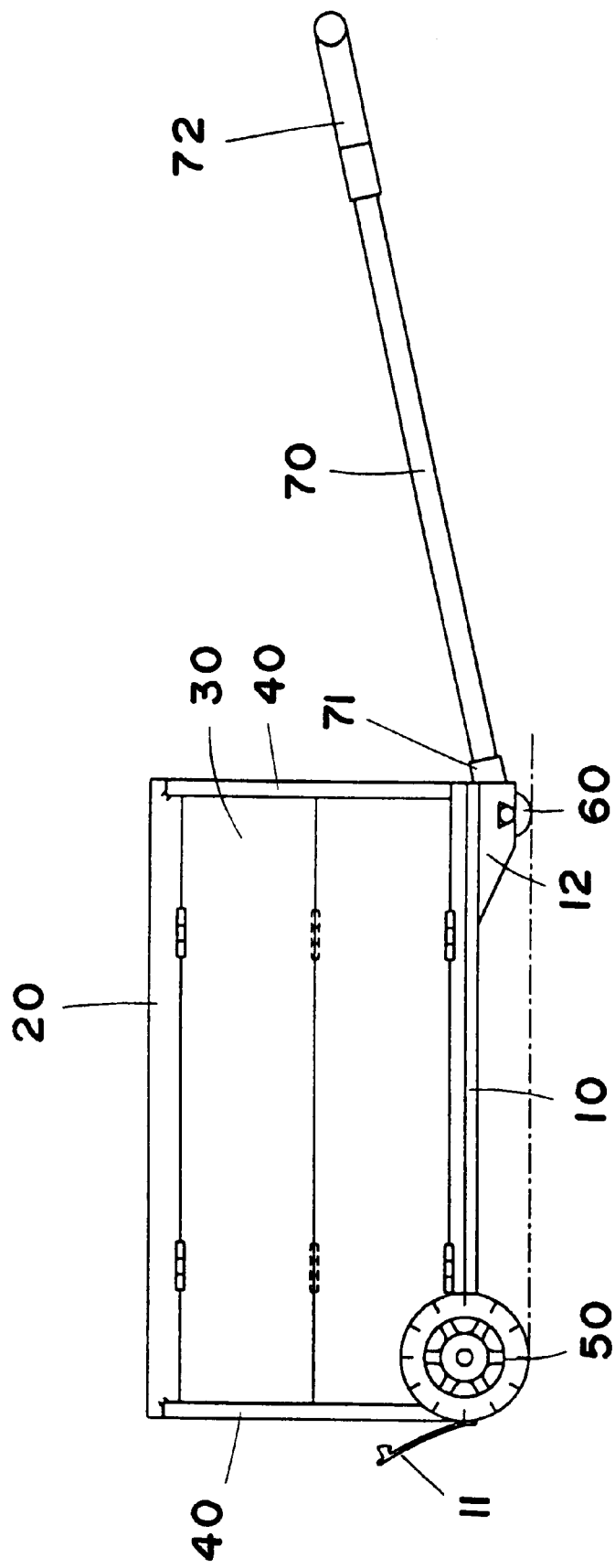
FIG. 4 is a cross section view showing the collapsed state of the collapsible trailer according to the present utility.

From the comparison between FIGS. 1 and 3, it is apparent that the trailer in a collapsed state can save much space. The trailer in expanding state can achieve the function of transferring, while the trailer in collapsed state can be deposited in a smaller space. Moreover, the collapsible trailer is provided with an auxiliary wheel on front side of the basket to provide firmer supporting force.

Moreover, the stick and bottom board is joined in a pivoting way by a tenon and a groove. The angle of the stick is fixed for the convenience of user.

Moreover, when user want to change the moving direction of the trailer, he can lift the stick and make the auxiliary wheel leave ground.

Although the present utility has been described with reference to the two preferred embodiments thereof, it will be understood that the utility is not limited to the details thereof. Various substitutions and modifications have suggested in the foregoing description, and other will occur to those of ordinary skill in the art. All such substitutions and modifications are intended to be embraced within the scope of the utility as defined in the appended claims.

I claim:

1. A collapsible trailer comprises a bottom board, a frame, foldable boards, lateral boards, primary wheels, auxiliary wheels, and a stick, wherein said bottom board is provided with a snapping tenon on one side, a pivoting stage on front side thereof, said pivoting stage being provided with a placing groove, a fixing stage being provided on the bottom side of said bottom board and facing said pivoting stage;

said frame is provided, on both side, with a set of foldable board pivoted on said bottom board, said frame being able to, relative to said bottom board, moved upward and downward through the help of said foldable board, said frame being provided with a snapping groove corresponding to said snapping tenon;

said frame is provided, on front and back side, with a set of lateral boards, the height of said lateral boards being equal to that of said foldable board in an expanding state, said frame being able to be fixed by said lateral boards when being lifted, said bottom board is provided with said primary wheel on backside thereof;

said auxiliary wheel is placed within a placing groove;

the head portion of said stick is pivoted on a pivoting stage through a sleeve, the end portion of said stick being provided with a grip for sake of holding, said stick being able to be inverted around said pivoting stage and then fixed on said fixing stage;

when collapsing the trailer, said lateral boards are folded inward first, then said foldable boards are folded such that said frame lies against said bottom board, the collapsed trailer is fixed by snapping tenon arranged on said bottom board, finally, said stick is inverted and attach to the bottom of said bottom board, thus collapsing the trailer to a plane-shape;

when expanding for operation, said stick is drawn out and the tenon is unlocked, said frame is lifted until said foldable boards are fully expanded, said lateral boards are drawn out to prop said bottom board, thus forming a basket shape.

2. The collapsible trailer as set forth in claim 1, wherein said placing groove has a penetrating coupling-groove of dovetail shape on both sides, and the axis of said auxiliary wheel is embedded into a coupling groove, therefore said auxiliary wheel can be placed within said placing groove.

3. The collapsible trailer as set forth in claim 1, wherein a detachable clamping-tenon is arranged on the bottom side of said pivoting stage, said sleeve is provided with a clamping groove corresponding to said clamping tenon, the angle of said stick can be fixed when said clamping tenon is inserted into said clamping groove.

* * * * *